United States Patent [19]

Ogasawara

[11] Patent Number: 5,019,765
[45] Date of Patent: May 28, 1991

[54] MOTOR CONTROL DEVICE FOR POWERED SEAT

[75] Inventor: Hiromitsu Ogasawara, Akishima, Japan

[73] Assignee: Tachi-S Co. Ltd., Tokyo, Japan

[21] Appl. No.: 492,674

[22] Filed: Mar. 13, 1990

[51] Int. Cl.$^5$ .............................. G05B 11/01
[52] U.S. Cl. ........................ 318/628; 318/466; 354/195.12; 338/162
[58] Field of Search ............... 318/628, 466; 354/195.12; 338/162

[56] References Cited

U.S. PATENT DOCUMENTS 4,422,064 12/1983 Araki et al. ............... 338/162
4,445,757 5/1984 Enomoto et al. .......... 354/195.12 X
4,809,180 2/1989 Saitoh ..................... 318/466 X Primary Examiner—William M. Shoop, Jr.
Assistant Examiner—Saul M. Bergmann
Attorney, Agent, or Firm—Oldham & Oldham Co.

[57] ABSTRACT

A motor control device for a powered seat comprising a switch capable of selective determination for rotation direction of a motor and further of depression for adjustment of rotation rate of the motor, and an electric circuit for causing the motor to rotate in a selected one of normal and reverse directions and increase or decrease its rotation rate in response to the switch-over and depressing/releasing operations of such one switch only.

8 Claims, 2 Drawing Sheets

MOTOR CONTROL DEVICE FOR POWERED SEAT

BACKGROUND OF THE INVENTION

1. Field of the Invention

The present invention relates to a motor control device for a powered seat used in a vehicle having a seating posture adjusting system therein to effect an adjustment in positions of the seat to support an occupant at a desired level, such as for adjusting fore-and-aft and vertical positions or support inclination angle of the seat, headrest or side support device.

2. Description of Prior Art

By and large, a vehicle or automotive seat is equipped with such seating posture adjusting system as a seat slide device, seat lifter, reclining device, movable headrest, side support device, and the like. In particular, a driver's seat is equipped with a lot of these adjusting systems with a view to giving a most seating preference or comfort to a driver on the seat, according to his or her physical constitution, the road conditions, and fatigue developed during a lengthy time of driving the car.

The adjustments of this sort are now executed under an electronic motor control on a switch operation basis, instead of a manual one, to deal with frequent adjustments with rapidity and ease during driving. Such demand produces what is recentlY called "powered seats" which has electrical and electronic control systems provided therein for enabling various multiple adjustments of the seat by simple operation of switches.

The motions or adjustments in such powered seat are actuated by a motor, and the control of the motor is a key to present variety of motions in the seat for many desired adjustments thereof. For instance, the normal or reverse rotation of the motor is effected by turning the switch to a corresponding "on" state, using a self return type switch having three switch positions: a neutral position, normal position and reverse position. The electrical communication between the switch and motor is supported by a relay and associated relay control circuits. Hence, an instruction signal from the switch activates the relays to switch-over the relay contact points in order to apply a given amount of voltage to the motor for causing motor to rotate in either a normal or reverse directions.

This on-off switch system provides only a given amount of voltage to the motor, and therefore the motor gives a fixed force to cause non-variable speed in adjustments of the powered seat. Hitherto known motor control systems have encountered such technical bar in contemplating fine and quick adjustments of the drive rate (speed) of the motor.

A possible solution to this problem may be for forming two motor control circuits: a high motor rate control and a low motor rate control connecting them electrically with the motor by two separate self return type switches. However, such circuit formation results in a very complicated construction of the control system and an annoying operation of the switches.

SUMMARY OF THE INVENTION

With the above-stated drawbacks in view, it is therefore a purpose of the present invention to provide a motor control device for a powered seat which permits a rapid switch operation for not only determining the rotation direction of a motor but also effecting a fine or rough adjustment of rotation the rate of said motor, and which is constructed in a more simplified manner.

In accomplishment of such purpose, the present invention comprises a switch with a variable resistance incorporated therein, having a normal switch position and a reverse switch position, each respectively for causing the normal and reverse rotation of the motor, the switch being further capable of depression such that the resistance amount of the variable resistance is varied according to a degree at which the switch is depressed or released, to thereby produce a varied voltage, a drive circuit electrically connected with the switch, the drive circuit receiving a normal or reverse signal from the switch, definitely imparting it to a relay for controlling the drive of the motor, while at the same time imparting the varied voltage produced by the depressing/releasing operation of the switch towards a voltage-variable power supply circuit connected by the relay with the motor.

Accordingly, simply one depressing of the switch effects a simultaneous operation for determining the rotation direction of the motor and varying the rotation rate of the same. A stepless, fine adjustment of the motor rotation rate can be made according to the depressing/releasing operation of the switch. The operation ability and construction in the device per se is therefore greatly simplified.

DETAILED DESCRIPTION OF PREFERRED EMBODIMENT OF THE INVENTION

Figure 1:
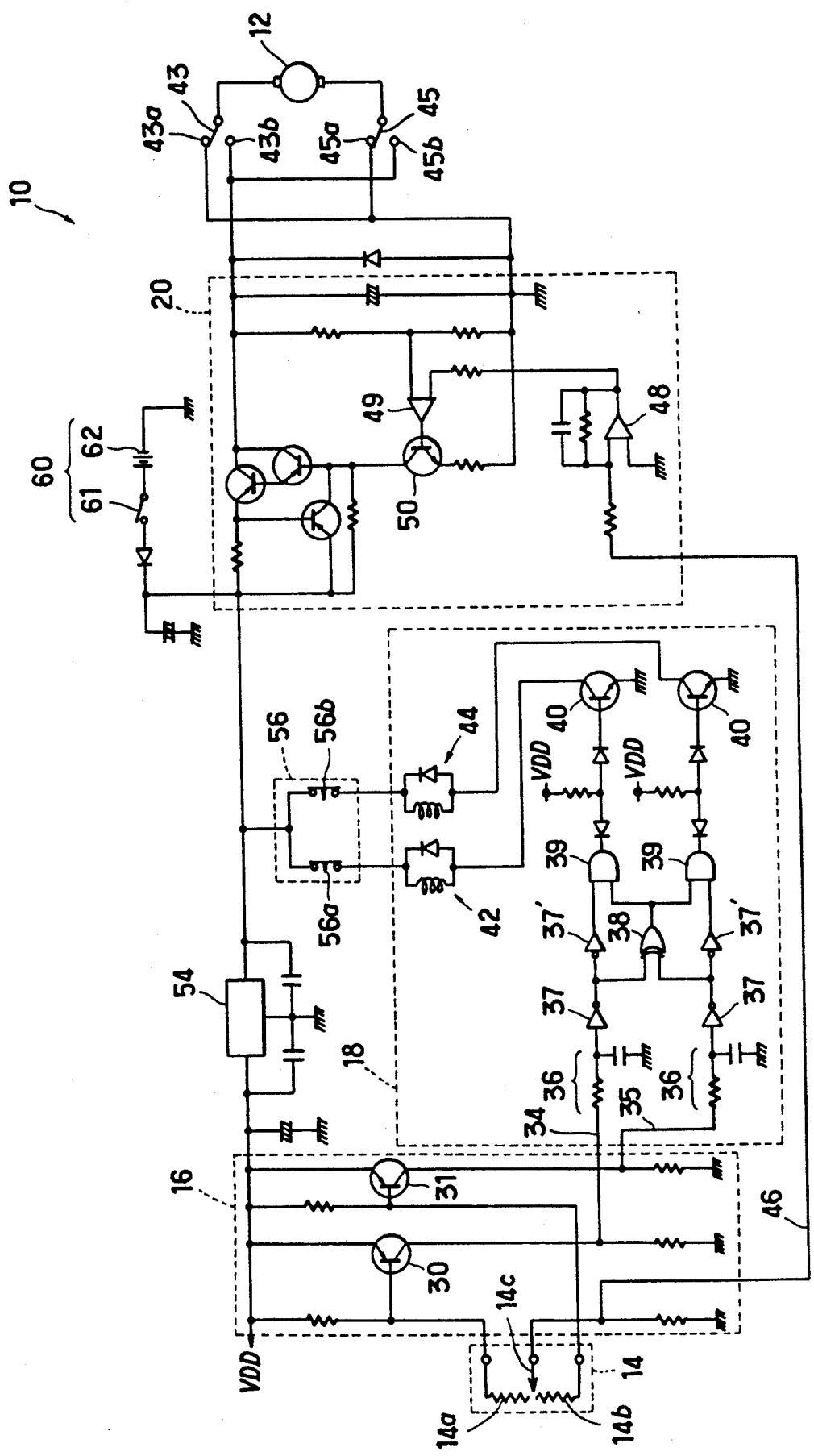
FIG. 1 is a circuit diagram of a motor control device in accordance with the present invention, in which the circuit is designed to be adaptable for use with a fore-and-aft adjustment system of the seat.

FIG. 1 shows a basic circuit associated with a motor control device (10) in accordance with the present invention.

Basically, the motor control device (10) is composed of a motor (12), a control switch (14), a drive circuit (16), a normal/reverse discrimination circuit (18), a relay (42, 43, 44, 45), a power source (50), and a voltage-variable power supply circuit (20).

The motor (12) is Preferably a DC geared motor, and the rotation direction and rate is controlled by operation of the control switch (14), as will be described specifically later.

The control switch (14) is of a two-contact-point type with a variable resistance incorporated therein; namely, as shown, a movable contact element 14c) is interposed between a pair of spaced-apart first and second resistances (14a)(14b), thus permitting not only selective choice of electrical contact between the contact element (14c) and either of the two resistances (14a)(14b), but also fine variation of a resistance amount. Preferably, a self return switch resistance (14a) at the normal switch position side, a current is flowed in the first transistor (30), which permits a bifurcated flow of the current; namely, the current is flowed into the switch (14), passing through the first resistance (14a) and contact element (14c) towards an electrical route (46) for a voltage variation purpose which varies the rotation rate of the motor (12) as will be explained later, and at the same time the current is also flowed into en electrical route (34) for causing the motor (12) to drive in the normal rotation direction, as will be described later. Reversely, when the contact element (14c) of the switch (14) is switched over to contact with the second resistance (14b) at the reverse switch position side, the current passes through the second resistance (14b) and contact element (14c) for the same voltage variation purpose and also is flowed into the other route (35) for the reverse rotation of the motor (12). Accordingly, the drive circuit (16) determines electronically the rotation rate and rotation direction of the motor in response to the switching-over operation of the control switch (14), and definitely imparts the corresponding signal and voltage to the normal/reverse discrimination circuit (18), relays (42)(44) and voltage-variable power supply circuit (20).

Then, for instance, with the switch (14) depressed at the normal switch position, the output voltage running in the route (34) is imparted into thc normal/reverse discrimination circuit (18) and undergoes a digital-away inspection therein as to which normal or reverse switch position it comes from and thereafter is precisely applied to the corresponding relay (42). The normal/reverse discrimination circuit (18) comprises a logic gate system which, preferably, includes an EX.OR gate (38) and a pair of AND gates (39)(39). As shown, in the discrimination circuit (18), the voltage, whether it is sent from either the normal route (34) or the reverse route (35), is treated by a combination of integrating circuit (36) and H-L inverter (37) (which refers to an inverter for inverting a high voltage signal into a low one) so as to be transformed into a proper low voltage signal. The EX.OR gate (38) inspects a voltage state between the two routes (34)(35), and insofar as the thus-produced low voltage signal is not flowed in both tow routes (34)(35), the EX.OR gate 38) emits a high voltage signal to one input terminal of the AND gate (39). At this moment, the low voltage signal passes through a L-H inverter (37) (which refers to an inverter for inverting a low voltage signal to a high one) and is thereby inverted into a high voltage signal which is flowed into the other input terminal of the AND gate (39), whereupon both input terminals of the AND gate (39) are applied the high voltage signals and therefore a high voltage is emitted from the output terminal of the gate (39) towards an output circuit composed of transistors (40)(40) and relays (42)(44). In this way, either of the signals sent through the different normal and reverse routes (34)(35) is discriminated clearly in a digital control way and precisely imparted to the corresponding relay (42 or 44), energizing the same to bring either of their respective normal and reverse relay contact elements (43)(45) to contact with their respective make points (43a)(45a), while bringing the other of them to contact with break points (43b)(45b). The motor (12) is thereby energized and driven in selected directions of normal and reverse rotation directions.

The output voltage in the normal route (34) is then applied to and energizes the relevant relay (42) so as to set its contact elements (43) in contact with the make point (43a), while the other relay (44) brings its contact element (45) to contact with the break point (45b), whereby the motor is energized via the power supply circuit (20) to rotate in the normal direction.

The contact element (14c) of the control switch (14) is connected by a route (46) with the voltage-variable power supply circuit (20), establishing an analog control system. That is, the voltage-variable power supply circuit (20), which is supplied a power from the power source (50), sends a varied voltage to the motor in response to a voltage-variation of the control switch (14). In the illustrated embodiment, the power supply circuit (20) includes a negative-feedback operational amplifier (48) as a first gate, and another normal amplifier (49) whose negative input terminal is connected with such amplifier (48). The latter amplifier (49) forms a second gate, with its output terminal connected with a transistor (50). Thus, those two gates (48)(49) provide a means for stabily amplifying a constant voltage in the circuit (20) to permit the voltage to be freely variable in a stable proportional relation with voltage-variation of the control switch (14). Stated otherwise, a constant voltage present in the power supply circuit (20) is varied by those two gates (48)(49) in a stable proportion to the amount of the switch area being depressed in the control switch (14), i.e. to the reduction of either of the two resistances (14a)(14b), and reversely, to release the depressing force upon the switch area gradually will then effect a corresponding increase of resistance in the switch (14) so as to reduce the voltage through the two gates (48)(49) in a proportional way. Accordingly, the increase and decrease of voltage in the circuit (20) is effected stepless-wise in conformity with the depressing and releasing degree in the switch (14).

It is seen also that the power supply circuit (20), cooperable with those gates (48)(49), is designed to supply a constant voltage, which includes transistors, semi-conductors and other required elements as illustrated, so as to impart a variable constant output voltage to the motor (12) through the relay contacts (43)(45) in a precise, stable proportional relation with the depressing-/releasing amount of the switch (14).

Consequently the motor (14) thus energized is driven in a selected one of normal and reverse rotation directions through the drive and discrimination circuits (16)(18) and simultaneously adjustable in rotation rate according to the degree of voltage being varied from the power supply circuit (20) through the depressing-/releasing operation of the switch (14).

Designations (61)(62) denote a main switch, preferably an ignition switch used in the vehicle, and a battery, respectively, which form the power source (60). It is noted that a voltage supplied from the power source (60) is also sent to another power supply circuit (54) and flowed therefrom as a constant voltage into the switch (14), drive circuit (16) and normal/reverse discrimination circuit (18).

Figure 2:
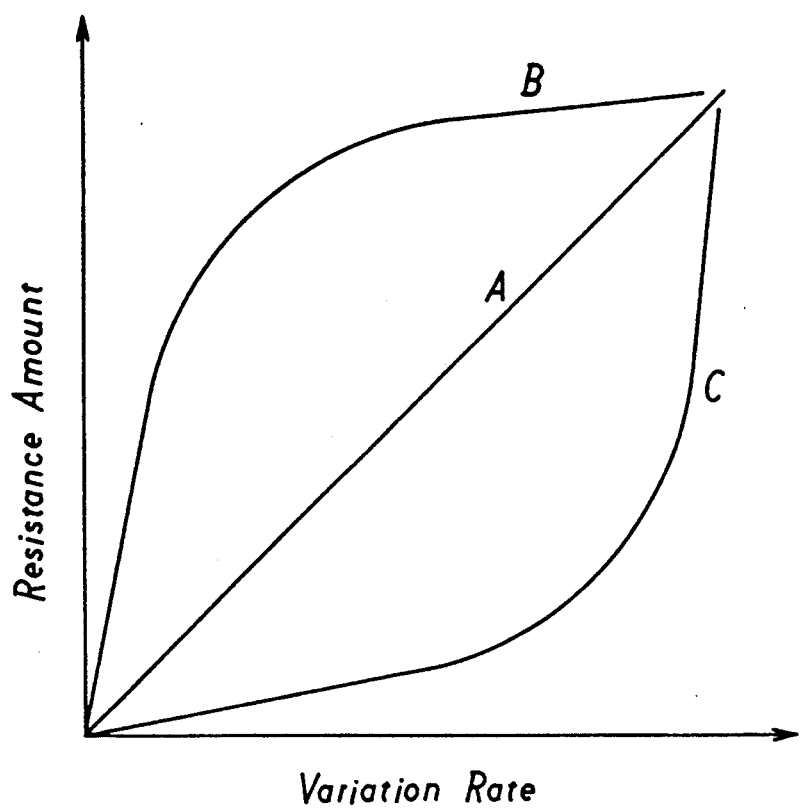
FIG. 2 is a graph showing three typical resistance characteristics of variable resistances which are applicable in the present invention.

The two resistances (14a)(14b) may be selected out of three typical, commonly available kinds of resistances (A)(B)(C , each having a different of resistance responsive to its variation rate, as shown in FIG. 2. In the figure, the resistance (A) shows a linear resistance characteristics, having thus a normal proportional relation with the depressing amount of the switch (14), the resistance (B) shows an initial rapid increase and a subsequent slow progressive increase of resistance responsive to its variation rate, and the resistance (C) shows an initial slow progressive increase of resistance and subsequent rapid increase of resistance. Thus, using those different resistances in the switch (14) may produce a unique rotation adjustment of the motor (12) for various purposes. For example, a movable part of an automotive seat may be moved in a fine changeable way according to a human delicate sense by use of either of the resistances (B)(C), instead of the one (A).

Figure 3:
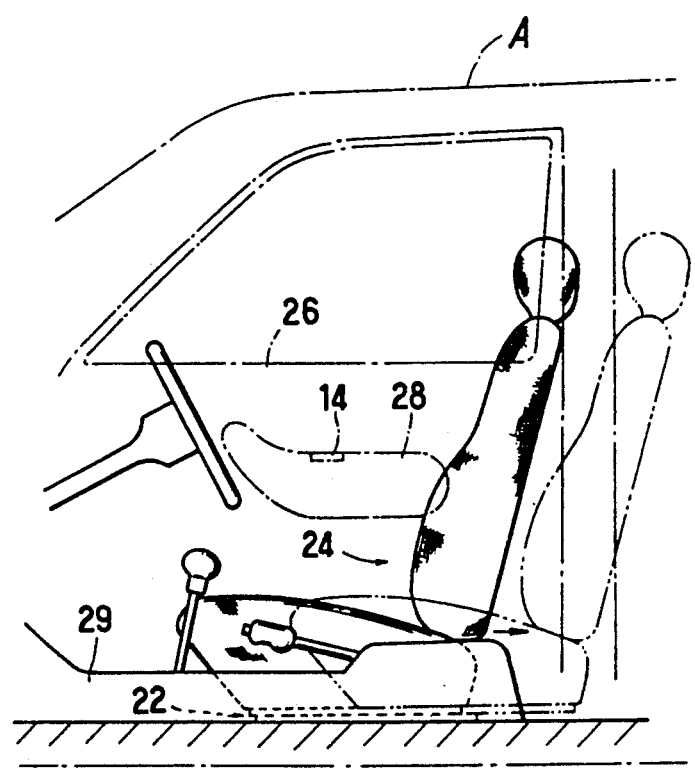
FIG. 3 is a schematic view of a powered seat with the fore-and-aft adjustment system.

FIG. 3 shows one example to which the above-discussed motor control device (10) is applied: Namely, in that figure, is illustrative a fore-and-aft adjustment of a driver's seat (24). Assuming now that the motor control device (10) is used for effecting such fore-and-aft adjustment, the seat (24) is provided with a slide rail device (22) and associated drive mechanism (not shown), and the motor (12) is a drive source to cause the fore-and-aft movement of the seat (24) along the longitudinal direction of the automobile (A), with the switch (14) being preferably located at an armrest (28) integral on the inner wall of a front door (26) of the automobile. t is desirable here that a limit switch (56) is incorporated in the basic circuit as seen in FIG. 1 with a view to providing a limit against the forward and backward movements of the seat (24), the limit switch (56) including a pair of first and second limit switch contacts (56a)(56b), such that the first contact (56a) is to be turned on, when the seat (24) reaches a predetermined forward limit point, so as to cut a current in the relevant relay (42) to cease the normal drive of the motor (12), whereupon the seat (24) is stopped at the forward limit point, whereas by contrast, when the seat (24) reaches a given backward limit point, the second contact (56b) is to be turned on, cutting thus a current in the corresponding relay (44) to cease the reverse drive of the motor (12), thereby stopping the seat (24) at the backward limit point.

In this embodiment, let it be assumed that the switch (14) is a self return switch which has a central switch position, a normal switch position and a reverse switch position as set forth previously, with the normal switch position corresponding to the switch relation between the contact element (14c) and resistance (14a) for causing the normal rotation adjustment of the motor (12), and with the reverse switch position corresponding to the opposed switch relation between the contact element (14c) and resistance (14b) for causing the reverse rotation adjustment of the motor (12). Referring to both FIGS. 1 and 3, if a driver depresses the reverse switch position area of the switch (14), an electric current and voltage are flowed through the second transistor (30) in the drive circuit (16) into the route (36) leading to the normal/reverse discrimination circuit (18) and then exactly flowed to the relay (44) which in turn sets the relay contact element (45) in contact with the make point (45a), while bringing the other relay contact element (43) into contact with the break point (43a), whereby the motor (12) is energized to drive in the reverse rotation direction, causing the seat (24) to move rearwardly from the solid line to the phantom line as In FIG. 3 through the slide rail device (22). in this condition, if the driver wishes to move the seat (24) quickly in the backward direction at a rough point, he or she has to depress greatly the reverse switch position area, so that the contact element (14c) is travelled along the resistance (14b), increasing the voltage to simultaneously increase a voltage in the variable-voltage power circuit (20), to thereby cause the motor (12) to rotate at a higher rate, which quickly transfers the seat (24) to a rough desired point. However, depending on a depress force upon the switch area, the rotation rate of the motor (12) may be changed freely so that a fine adjustment can be effected to cause the seat (24) to move precisely at desired point. When, reversely, it is desired to move the seat (24) forwardly, the driver depresses the normal switch position of the switch (14), an electric current and voltage is then flowed through the first transistor (30), route (34), discrimination circuit (18), and the relay (42), thereby setting the relay contact (43) in contact with the make point (43a) and bringing the other contact (45) to contact with the break point (45a), with the result that the motor (12) is driven in the normal rotation direction to cause the seat (24) to move forwardly. In this case, also, the same fine adjustment may be effected to vary the rotation rate of the motor (12), depending on the depressing degree on the normal switch position area of the switch (14).

Designation (29) denotes a console box mounted in the cabin of the automobile (A), in which the control switch (14) may be arranged.

From the descriptions above, it is appreciated that simply one depressing of the self return type switch (14) permits a simultaneous operation for determining the rotation direction of the motor (12) and varying the rotation rate of the same, and that a stepless, fine adjustment of the motor rotation rate is effected in accordance as the switch (14) is depressed down or released. Thus, both rotation direction and rate may be controlled by one switch through a control circuit like the illustrated basic circuit, which simplifies both structure and operation of the device (10).

The present invention is not limited to the abovementioned fore-and-aft adjustment of the seat (24), and applicable to other control devices for a seat lifter, a reclining device, a movable head rest, a side support device, and the like. Further, the circuit of the present invention is not necessarily restricted to the illustrated one, but any other suitable circuit constructions may be arranged to materialize the above-discussed concept of the present invention, without departing from the spirit and scope of the appended claims.

What is claimed is:

1. A motor control device for a powered seat in which the best includes a seating posture adjustment means therein and a movable part of said seating posture adjustment means is moved and adjustable by control of aid motor, said motor control device comprising:
   a switch means for selectively determining a rotation direction of said motor and capable of depression for a stepless adjustment of a rotation rate of said motor;
   a drive circuit connected electronically with said switch means;
   a voltage-variable power supply circuit connected electrically with said switch mean and motor; and
   a relay means having an electrical communication with both said drive circuit and voltage-variable power supply circuit;
   whereby a switch-over operation of said switch means imparts a signal to determine said rotation direction of said motor and a depressing/releasing operation of said switch means causes a step-less variation of a voltage to said motor, thereby permitting said rotation rate of said motor to be increased and decreased in a stepless way, continuously from said switchover operation.

2. The motor control device according to claim 1, wherein said switch means comprises a self return switch having a central switch position, a normal switch position and a reverse switch position, wherein depressant said normal switch position determines a normal rotation direction of said motor, while depressing said reverse switch position determines a reverse rotation direction of said motor.

3. A motor control device according to claim 1, further including a digital control circuit for definitely imparting to said relay means a signal which is sent from said switch means via said drive circuit, and wherein analog control circuit is provided between said switch means and said voltage-variable power supply circuit, to thereby permit a fine, stepless adjustment of said rotation rate of said motor in response to the degree to which said switch mans is depressed or released, following said switch-over operation thereof.

4. A motor control device for a vehicle seat in which the seat includes a seating posture adjustment means therein, and said seating posture adjustment means includes a movable part, said motor control device comprising:

a motor for causing movement of said movable part of said seating posture adjustment means;

a self return type switch having a variable resistance means incorporated therein, said switch selectively determining a rotation direction of said motor said self return switch capable of depression for adjustment of a rotation rate of said motor, wherein said self return switch has a normal switch area and a reverse switch area for enabling a switch-over operation thereupon, such that depressing said normal switch area causes said motor to rotate in a normal rotation direction, while depressing said reverse switch area, causes said motor to rotate in a reverse rotation direction, and where, according to a degree at which either of said normal and reverse switch area is depressed or released, a resistance amount of said variable resistance means is varied to thereby produce a varied voltage for adjustment of said motor rotation rate;

a drive circuit electrically connected with said self return switch, said drive circuit being activated in response to said switch-over operation of said switch, so as to determine a definite conveyance of one of said normal and reverse signals as well as said varied voltage;

a normal/reversed discrimination circuit electrically connected with said drive circuit , said normal/reverse discrimination circuit receiving one of said normal and reverse signals, discriminating it as to which said normal switch area or said reverse switch area it comes from, and then energizing a relay means which control a drive of said motor so that a corresponding contact point of said relay means is turned on for causing said motor to drive in a required one of said normal and reverse rotation directions; and a voltage-variable power supply circuit connected electrically with said switch, said power supply circuit being so designed as to vary an output voltage in a proportional response to said depressing degree of said switch and impart said varied output voltage to said motor via said contact point of said relay means, whereby said motor is driven in a selected one of said normal and reverse rotation directions by the switch-over operation of said switch and at the same time adjusting its rotation rate according to said depressing/releasing degree.

5. The motor control device according to claim 4, wherein aid drive circuit includes a pair of first and second transistors electrically connected with said switch, said first transistor is adapted to connect with said reverse switch area whereby said drive circuit conveys said varied voltage at said variable resistance to said voltage-variable power supply circuit, and conveys a selected one of said normal and reverse signals to said normal/reverse discrimination circuit.

6. The motor control device according to claim 4, wherein said normal reverse discrimination circuit includes a digital control circuit having a logic gate means.

7. The motor control device according to claim 6, wherein said logic gate means includes an EX.OR gate and a pair of AND gates.

8. The motor control device according to claim 4 wherein said voltage-variable power supply circuit includes a negative-feedback operational amplifier and a second operational amplifier whose negative input terminal is connected therewith and positive input terminal is connected with a transistor which is incorporated in said power supply circuit, whereby a variable constant voltage is imparted to said motor in a stable proportion to said depressing/ releasing degree of said switch.

* * * * *